No. 822,207. PATENTED MAY 29, 1906.
A. J. HARPER.
DRAG.
APPLICATION FILED SEPT. 22, 1905.
2 SHEETS—SHEET 1.
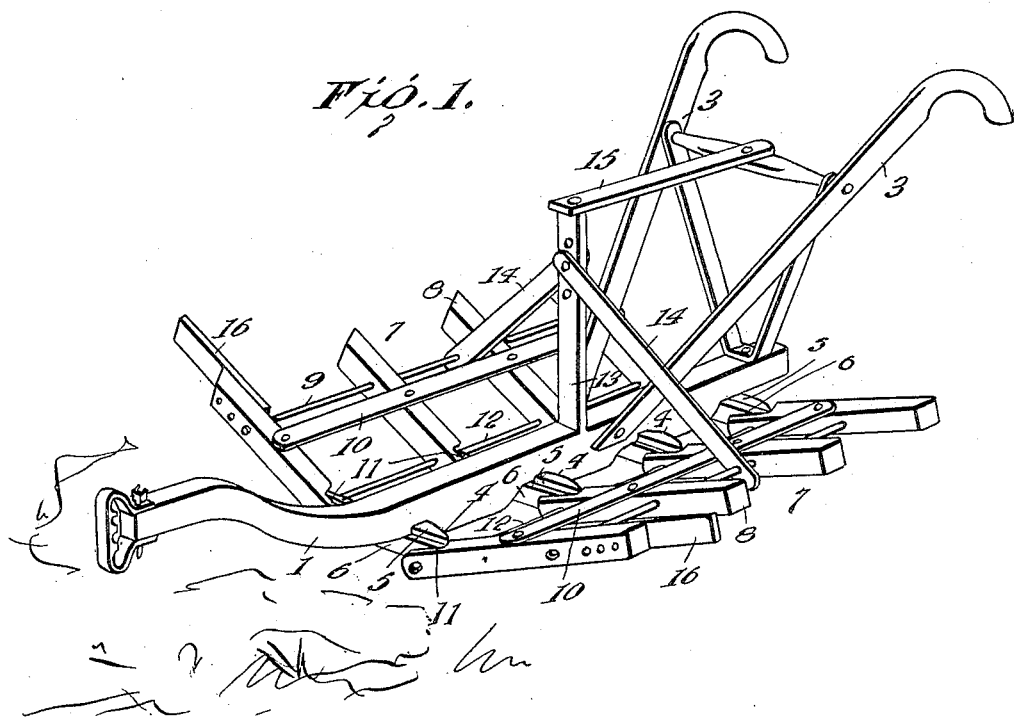
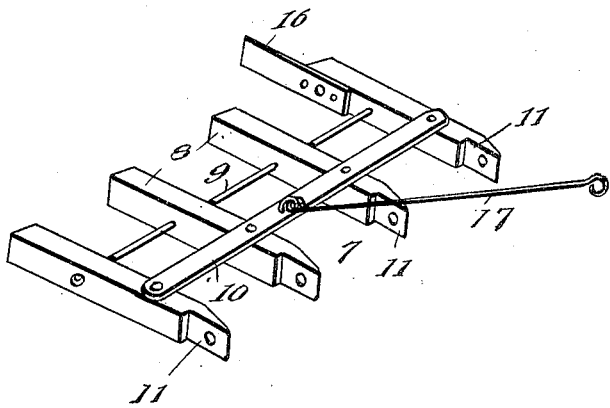
Inventor
A. J. Harper.

No. 822,207. PATENTED MAY 29, 1906.
A. J. HARPER.
DRAG.
APPLICATION FILED SEPT. 22, 1905.
2 SHEETS—SHEET 2.
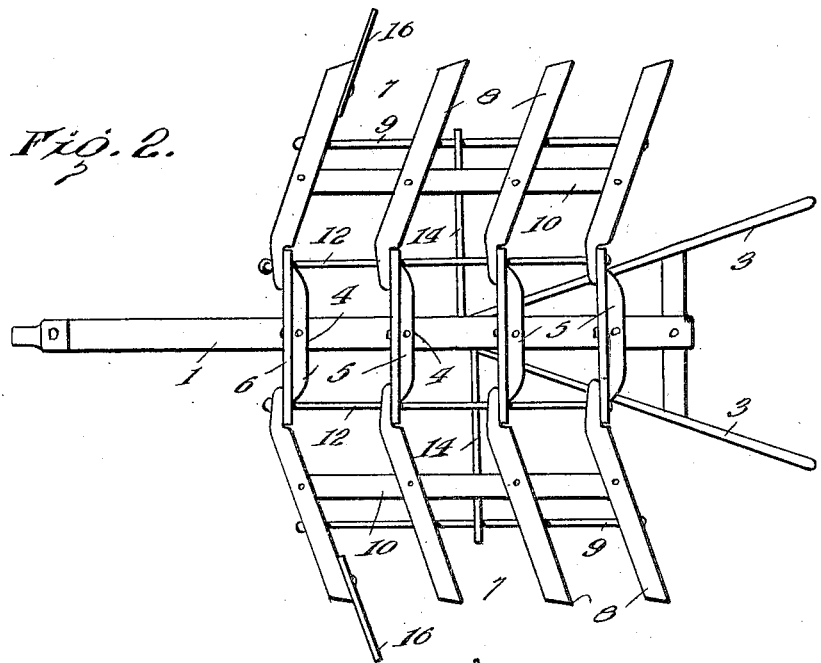
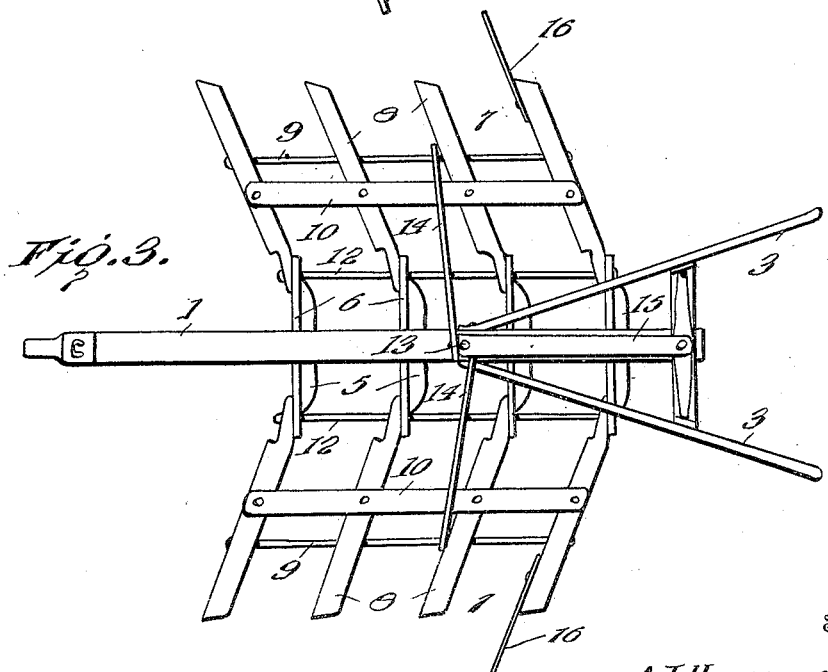
Witnesses
Inventor
A. J. Harper
By
Attorneys

UNITED STATES PATENT OFFICE.

ANDREW J. HARPER, OF DALTON, KENTUCKY, ASSIGNOR OF ONE-HALF TO LEANDER F. SHELTON, SR., OF PROVIDENCE, KENTUCKY.

DRAG.

No. 822,207.      Specification of Letters Patent.      Patented May 29, 1906.

Application filed September 22, 1905. Serial No. 279,697.

*To all whom it may concern:*

Be it known that I, ANDREW J. HARPER, a citizen of the United States, residing at Dalton, in the county of Hopkins and State of Kentucky, have invented certain new and useful Improvements in Drags, of which the following is a specification.

This invention relates in general to agricultural implements, and more particularly to an improved form of drag.

The object of the invention is to provide a device of this character which can be used with equal facility either for crops growing in hills or upon level ground.

With this object in view the invention consists, essentially, of a framework provided with a series of transversely-arranged scraping-blades, wings pivotally mounted upon each side of same and formed with obliquely-arranged scraping-blades which are adjusted to throw the dirt either away from or toward the center of the drag, and means for adjusting the vertical angle formed by the wings to conform to the slope of the hills.

For a full description of the invention and the merits thereof and also to acquire a knowledge of the details of construction of the means for effecting the result reference is to be had to the following description and accompanying drawings, in which—

Figure 1 is a perspective view showing my improved form of drag. Fig. 2 is a bottom plan view of same, having the wings adjusted so as to throw the dirt away from the drag. Fig. 3 is a top plan view and showing the wings adjusted so as to throw the dirt toward the center of the drag. Fig. 4 is a detail perspective view of one of the wings and shows a modified form of attaching the adjusting members thereto.

Corresponding and like parts are referred to in the following description and indicated in all the views of the drawings by the same reference characters.

The numeral 1 designates the beam, the forward end of which is bent upward and adapted to be connected to the horses, while the rear end is provided with handles 3, which may be of any conventional form. The lower side of the beam 1 is provided with a series of notches 4, forming shoulders facing the front of the device and against which the fixed scraping-blades 5 are secured. Transverse members 6 are secured to the front of the scraping-blades 5 and extend beyond the ends of same and form projections by means of which the wings are secured in position. The wings 7 comprise a series of obliquely-arranged scraping-blades 8, connected by the longitudinal rod 9 and a beam 10, running along the top of them. The inner ends of these blades 8 are notched at 11 and pivoted upon the projecting portions of the transverse members 6 by means of removable pins 12. These pivotally-mounted wings 7 are adjustably connected to an upright member 13 upon the beam 1 by means of members 14. These members 14 are connected to the upright member 13 by means of a pin which is adapted to pass through any one of a series of openings therein, and by this means the wings can be adjusted so as to operate upon the level or given any desired vertical arrangement, according to the slope of the hills on each side of the furrow. A brace 15 connects the upper portion of the upright member 13 to the handle 3 and serves as a reinforcing means to give the necessary rigidity. One of the oblique scraping-blades 8 in each of the wings 7 is provided with an extension 16, which is adjustable and serves to complete the hilling where the rows are too wide for the drag. These extensions 16 will be found very useful and will save much hoeing, which would otherwise have to be done by hand. By removing the pins 12 the wings 7 may be reversed, as shown in Fig. 3, so as to slant toward the front of the drag and throw the dirt inward.

Should it be found desirable to employ the drag upon level ground, the wings are adjusted so as to lie approximately in the plane of the fixed scraping-blades 5 and to throw the dirt either inward or outward, as required.

When the device is used for cultivating crops which are planted in hills, it is drawn along the furrow with the wings adjusted so as to have a vertical angle corresponding to the slope of the hill and may be arranged, as in the previous instance, so as to throw the dirt either away from or upon the hill. The hills will not always be spaced according to the width of the drag, and the adjustable extensions 16 will be found very useful.

A modified form of adjusting member is shown at 17 in Fig. 4, and it will be observed that same is directly connected to the longitudinal beam 10 instead of to the rod 9. This construction may be found preferable under certain conditions of work.

It must also be understood that I do not limit myself to any specific number of scraping-blades, since that will depend almost entirely upon the requirements of the various conditions under which the drag may be used.

Having thus described the invention, what is claimed as new is—

1. In a device of the character described, the combination of a framework, a series of transversely-arranged scraping-blades secured thereto, wings pivoted on each side thereof and formed with obliquely-arranged scraping-blades, and means for adjusting the slope of the wings.

2. In a device of the character described, the combination of a framework, a series of transversely-arranged scraping-blades secured thereto, wings pivotally mounted on each side thereof and formed with obliquely-arranged scraping-blades, said wings being reversible to throw the dirt either away from or toward the center of the device, and means for adjusting the slope of the wings.

3. In a device of the character described, the combination of a framework, a series of transversely-arranged scraping-blades secured thereto, wings pivotally mounted on each side thereof and formed with obliquely-arranged scraping-blades, one of the scraping-blades on each wing being provided with an adjustable extension, and means for adjusting the slope of the wings.

4. In a device of the character described, the combination of a framework, a series of transversely-arranged scraping-blades secured thereto, transverse members located adjacent the scraping-blades and projecting beyond the ends thereof, wings formed with a series of obliquely-arranged scraping-blades having one of their ends pivotally attached to the projecting portions of the before-mentioned transverse members, and means for adjusting the slope of the wings.

5. In a device of the character described, the combination of a beam having notches on one side thereof, a series of transversely-arranged scraping-blades secured in said notches, wings pivotally mounted on each side thereof and formed with obliquely-arranged scraping-blades, and means for adjusting the slope of the wings.

6. In a device of the character described, the combination of a beam having a series of notches on one side, a series of transversely-arranged scraping-blades secured in said notches, transverse members adjacent said scraping-blades and projecting beyond the ends thereof, wings formed with a series of obliquely-arranged scraping-blades having one of their ends pivotally attached to the projecting portion of the before-mentioned transverse members, and means for adjusting the slope of the wings.

7. In a device of the character described, the combination of a framework, an upright member upon said framework, transversely-arranged scraping-blades secured to the framework, wings pivotally attached on each side thereof and formed with a corresponding series of scraping-blades, and members adjustably connecting the wings to the before-mentioned upright member to regulate the slope of same.

In testimony whereof I affix my signature in presence of two witnesses.

ANDREW J. HARPER. [L. S.]

Witnesses:
  W. W. WILSON,
  FRED HOFFMAN.